United States Patent
Simon et al.

(10) Patent No.: US 8,162,120 B2
(45) Date of Patent: Apr. 24, 2012

(54) FRICTION CLUTCH

(75) Inventors: Yannick Simon, Lauterburg (FR);
Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/661,828

(22) Filed: Mar. 24, 2010

(65) Prior Publication Data
US 2010/0258399 A1    Oct. 14, 2010

Related U.S. Application Data (63) Continuation of application No. PCT/DE2008/001439, filed on Aug. 28, 2008.

(30) Foreign Application Priority Data

Sep. 24, 2007  (DE) .......................... 10 2007 045 584

(51) Int. Cl.
*F16D 13/75*  (2006.01)
*F16D 13/50*  (2006.01)
(52) U.S. Cl. ............. 192/70.252; 192/70.27; 192/89.23; 192/111.19
(58) Field of Classification Search ............. 192/111.18, 192/111.19
See application file for complete search history.

(56) References Cited

U.S. PATENT DOCUMENTS

| 4,602,708 A | * | 7/1986 | Nagano ....................... 192/70.27 |
| 5,803,224 A | * | 9/1998 | Kimmig et al. ........... 192/70.252 |
| 6,029,787 A | * | 2/2000 | Reik et al. ................ 192/70.252 |
| 6,260,684 B1 | | 7/2001 | Lebas et al. ................ 192/70.27 |

FOREIGN PATENT DOCUMENTS

| DE | 42 39 289 A1 | 5/1993 |
| DE | 42 39 291 A1 | 5/1993 |
| DE | 43 06 505 A1 | 9/1993 |
| DE | 43 22 677 A1 | 1/1994 |
| DE | 43 45 215 B4 | 1/1994 |
| DE | 44 18 026 A1 | 12/1994 |
| DE | 44 31 641 A1 | 3/1995 |
| DE | 195 10 905 A1 | 10/1995 |
| EP | 1 710 461 A | 10/2006 |
| FR | 2 764 015 A | 12/1998 |
| GB | 2 120 329 A | 11/1983 |
| GB | 2 278 894 A | 12/1994 |
| GB | 2 305 698 A | 4/1997 |

* cited by examiner

*Primary Examiner* — Richard M. Lorence
(74) *Attorney, Agent, or Firm* — Alfred J. Mangels (57) ABSTRACT

A friction clutch for a drive train, the clutch including a pressure plate rotatably fixed and axially displaceable relative to a housing. A disc spring is provided between the housing and the pressure plate to axially act on the pressure plate. An adjusting device is effective between the housing and the disc spring to compensate for friction lining wear of a clutch plate that interacts with the pressure plate when the clutch is operated in the drive train. The disc spring is pivotable relative to an annular support carried by the housing. An axial force is applied to the disc spring in the direction of the support by springs that include a leaf-spring, a sensor spring, and an additional spring.

12 Claims, 5 Drawing Sheets

FRICTION CLUTCH

CROSS-REFERENCE TO RELATED APPLICATION

This application is a continuation of International application Ser. No. PCT/DE2008/001439, having an international filing date of Aug. 28, 2008, and designating the United States, the entire contents of which is hereby incorporated by reference to the same extent as if fully rewritten.

BACKGROUND OF THE INVENTION

1. Field of the Invention

The invention relates generally to friction clutches, particularly to clutches in which a wear-compensating adjusting device is provided, at least for wear of the clutch friction lining.

2. Description of the Related Art

Such clutches are described or mentioned in patent applications DE OS 42 39 291, DE OS 43 06 505, DE OS 42 39 289, DE OS 43 22 677, DE OS 44 18 026, DE OS 44 31 641 and DE OS 195 10 905. Such friction clutches are intended for application in a motor vehicle drive train, among others, and in many cases they possess a pressure plate that is non-rotatable with respect to the housing but is axially limitedly displaceable. At least a disc spring is provided between the housing and pressure plate that pressurizes the pressure plate in an axial direction away from the housing. The adjusting device provided in the friction clutch ensures an at least approximately constant interlocking state of the disc spring, and thus also of an approximately equal pressing force during the service life of the friction clutch when it is mounted in the drive train.

An object of the present invention is to provide friction clutches of the kind cited above, by which both its manufacture and the manufacture of its components can be simple and cost effective, wherein those components are also easy to dimension in order to ensure an optimum function of the friction clutch. A further task consists of providing friction clutches that feature a possibly low and/or possibly constant release force characteristic over the service life or over the wear of the friction clutch, at least after the release of the clutch plate, via the release travel of disc spring fingers and by taking possible manufacturing tolerances or scattering into consideration. In addition, over the maximum possible release distance and over the service life of the clutch, an impermissible or undesired load rise angle should be avoided, since it could impair the function of the readjustment device.

SUMMARY OF THE INVENTION

A friction clutch of the type mentioned above, which features an adjusting device acting between the housing and the disc spring, which ensures at least partial compensation of the friction lining wear of a clutch plate interacting with the friction clutch and the pressure plate mounted in a drive train, wherein the disc spring can be swiveled with respect to an annular support born by the housing, and is exposed to force via a spring in axial direction of this support. The objects on which this invention are based are solved, among others, in that the disc spring exerting the axial force includes at least the following spring elements:

leaf-spring-type means that are connected on the one hand with the housing and on other hand with the pressure plate, and at least feature interlocking in the mounted state of the friction clutch, which the pressure plate exerts axially towards the disc spring, whereby with increasing friction lining wear increases the axial force exerted by the leaf-spring-type means on the pressure plate, a disc spring-type sensor spring, which is operatively and elastically stressed between the housing and the disc spring and pressurizes the disc spring axially towards the support, at least an additional spring means operatively and elastically stressed between the housing and the disc spring, and the latter exerts an axial force towards the support, whereby this additional spring means, when the disc spring is swiveled to release the friction clutch, and with increasing friction lining wear, has a tendency with an increasing force characteristic.

Over the life span of the friction clutch, at least the pressure plate and the disc spring can undergo an axial displacement relative to the housing, at least owing to the friction lining wear, through which the interlocking state of the leaf-spring-type means of the sensor spring and of the additional spring means changes. The adjusting device also causes the support of the disc spring to be axially displaced in dependence upon the friction lining wear that has occurred.

Advantageously, the introduction of the supporting force exerted axially by the sensor spring on the disc spring can occur at least approximately at the radial height of the support between the disc spring and pressure plate. For many applications it can also be advantageous, however, when that force introduction point is provided at another diametrical area of the disc spring, e.g., at least approximately at the radial height of the support, or radially outside or radially within the support. In case a force is introduced at the height of the support, no torque is introduced into the disc spring through the sensor spring. When force is introduced radially outside the support, torque or a force is introduced in the disc spring from the sensor spring, which acts against the disc spring. When the sensor spring is supported radially within the support, torque or a force is introduced in the disc spring, through which a support of the disc spring takes place in the closing direction of the friction clutch.

Furthermore, it can be appropriate when the axial force is introduced radially within the support by the additional spring means onto the disc spring. The force introduced by the additional spring means can nonetheless occur also at another diameter area of the disc spring, and in a similar manner as described in connection with the sensor spring. It can be particularly advantageous when the introduction of the axially exerted support forces by the sensor spring and the additional spring means on the disc spring, with respect to the annular support, occur on different radial sides. For instance, the force introduced by the sensor spring can occur radially outside the support, and the force introduced by the additional spring means can occur radially within the support. Through such an arrangement, at least a certain compensation of the torque introduced through the sensor spring and additional spring means in the disc spring is possible based on the support.

The additional spring means can be formed advantageously by a component preferably manufactured of steel, and which has an annular area from which radially extending arms featuring spring properties originate, which arms exert axial pressure on the disc spring. Preferably, the arms are oriented radially outwards with respect to the annular area. The annular area can be supported axially indirectly or directly on the clutch housing. The support of the annular area can occur in a simple manner by means of additional arms, which likewise originate from the annular area and serve to support the additional spring means on the housing. If required, the additional arms can likewise feature a certain spring action or spring property.

Advantageously, the annular area, the spring arms, and the additional arms can be formed as a single piece.

The support of additional spring means relative to the housing can be provided in a simple manner by means of bayonet-type locking connection, whereby to form the bayonet-type connection the additional arms can be provided with areas formed accordingly. By fitting it axially on the additional spring means and rotating the same relative to the housing, the bayonet-type locking or bayonet connection can be established. The additional arms can be supported by means of support areas provided on the housing. The additional arms of the additional spring means can be aligned axially and be attached accordingly to the adapted areas of the clutch housing.

The additional arms of the additional spring means can, however, be formed or aligned in a manner similar to the spring arms. Such additional arms can extend radially outwards—from the annular, closed area, and are supported axially on the support-areas on the housing. With such an embodiment it can be advantageous when the spring arms and additional arms, viewed in the circumferential direction, are provided alternately, whereby, viewed in the circumferential direction, between two additional arms at least two spring-loaded arms can also be provided. With such an embodiment of the additional spring means, additional arms and if necessary the ring area connected with these arms can also feature a certain springy property. For the support of additional arms, posts fixed on the housing can be used, which posts extend axially through openings of the disc spring. Such posts have support areas, e.g., in the form of a bolt head, for additional arms. The axial support means for the additional arms can simultaneously serve as support means for the disc-spring-type sensor spring.

Through the arrangement of spring means in a friction clutch in accordance with the invention and with the adjusting device, which acts between the housing and disc spring, the excess travel safety margin when releasing the friction clutch can be increased, and since, after the adjustment point or range in which an existing lining wear is compensated by the adjusting device, the resultant force that pressurizes the disc spring against the housing-side swivel support increases. That total force is generated by the friction clutches according to the manner described above in the many cases through the cushion deflection effect between the friction linings, the leaf-spring-type means provided between the housing and the pressure plate, and at least an energy accumulator supporting the disc spring axially, which can be formed as a diaphragm. Upon release of the clutch plate through the pressure plate, the effect of axial cushion on the pressure plate is neutralized. At this release point, or rather within the release travel area adjoining this release point, the lining wear can be compensated by actuating the adjusting device. That is described in detail in the state of the art disclosed above, on account of which with regard to the function and possible embodiment of the adjusting device used in connection with the present invention, adjusting devices that can be utilized are clearly referred to in those disclosures, so that, in the present application in this respect, detailed description is not necessary.

Through the application of the spring element supporting the disc spring axially according to the invention, which features at least a progressive force characteristic over the residual release travel after the release of the clutch plate by the pressure plate, it is ensured at least over this residual release travel that the total force supporting the disc spring axially will be greater. Thus, the one exerting pressure against the cover side support, through which also the release force on which the disc spring finger tips act, can become accordingly greater, and particularly in the end area of the release travel, without undesired self-adjustment occurring, so that self-adjustment is not traced back to wear.

Based on the use combination of the spring elements according to the invention, the total axial supporting force acting on the disc spring, which the disc spring exerts against a cover-side support or pivot and also supports during the release of the friction clutch so that the latter can be swiveled in the support's diameter area, can feature a practically constant or slightly increasing force characteristic through the adjustment travel of the friction clutch as a result of wear. That force characteristic can be generated by means of an additional spring means, which has a progressive—thus an increasing force characteristic over the release travel of the disc spring and the axial displacement travel of the disc spring for wear compensation. The additional leaf-spring-type means can be installed between the housing and the pressure plate such that they have a degressive, thus, decreasing force characteristic, thus via the release travel of the friction clutch, which means also via the displacement of the pressure plate in the release direction. The resilience characteristic of the leaf-spring-type means and that of the additional spring means acting parallel to it can be tuned to one another such that the resulting force characteristic generated by the latter, which acts on the disc spring, practically remains constant over the possible release travel of the pressure plate relative to the housing. Such coordination is advantageous when using a sensor spring, which contributes the major portion of the required force for the pivoted holder of the disc spring on the housing.

For the self-adjustment function of the adjusting device between the disc spring and clutch housing, it can be particularly appropriate when, in the case of lining wear, the force characteristic required for the release of the friction clutch becomes greater, whereby it can be ensured that at least a force is generated over a small region of the release force characteristic, which force causes a small axial displacement of the axially spring-loaded support. That small axial displacement enables the adjusting device to compensate for the wear that has occurred. The disc spring can advantageously feature a characteristic curve that ensures that the force required for swiveling the disc spring decreases during the displacement of the spring-loaded support. Through such a design of the disc spring, it can be ensured in the presence of lining wear that equilibrium can be set between the forces acting axially on both sides on the disc spring. Advantageously, the disc spring can feature at least a falling load-travel characteristic curve over a part of the release travel range, in particular in the section within which the self-adjustment occurs.

Further features or suitable embodiments if applicable and advantages of the invention are found in the following description of figures.

BRIEF DESCRIPTION OF THE DRAWINGS

The invention is explained in detail hereinafter based on the following drawing figures.

DESCRIPTION OF THE PREFERRED EMBODIMENTS

Figure 1:
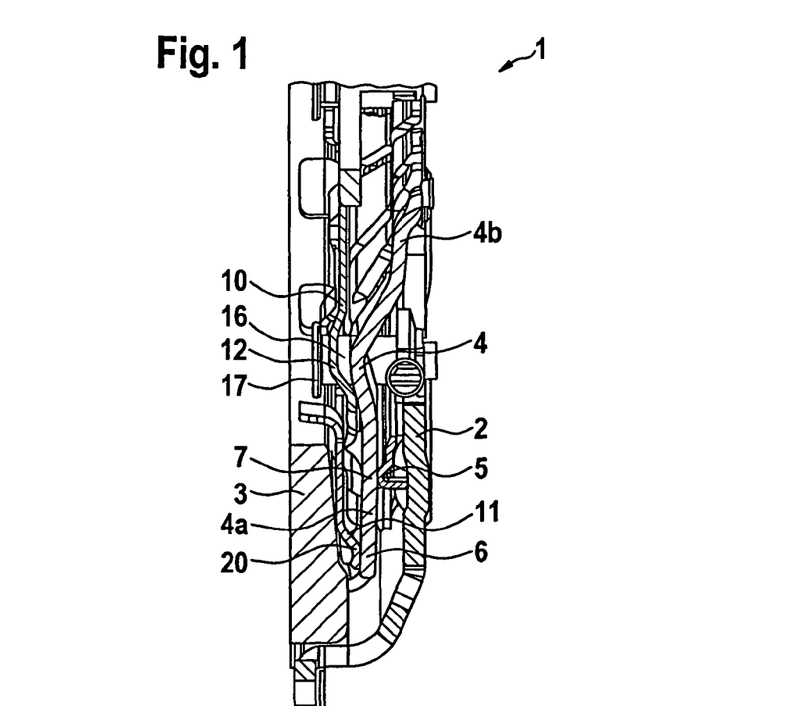
FIG. 1 shows a friction clutch according to an embodiment of the invention in a half-sectional view.
Figure 2:
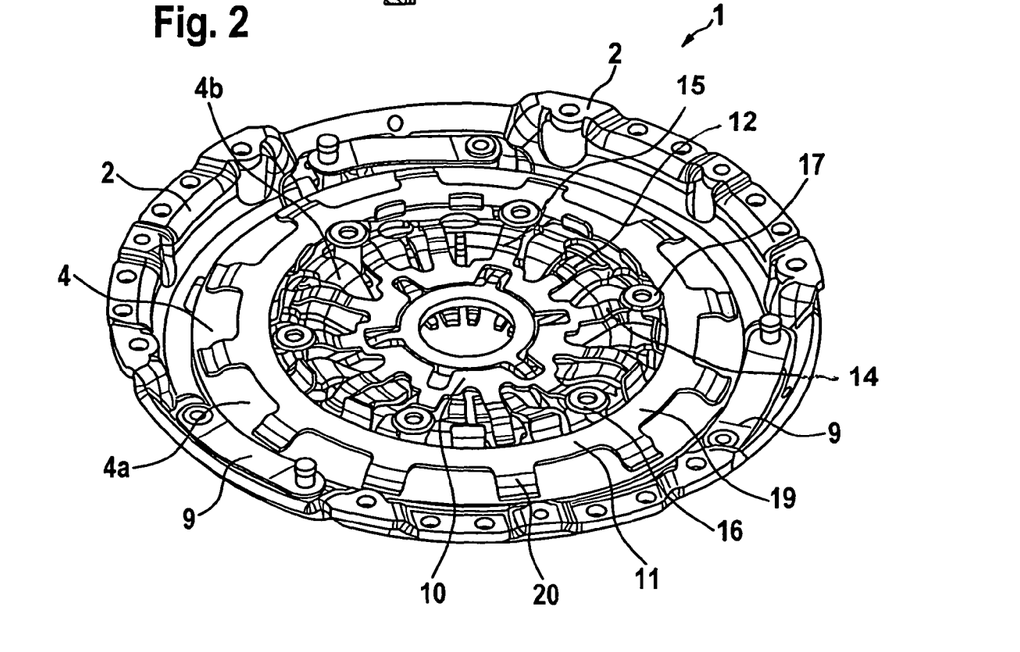
FIG. 2 shows a perspective interior view of the friction clutch without the pressure plate.

The friction clutch 1 shown in FIGS. 1 and 2 includes a housing 2 and a pressure plate 3 non-rotatably connected with it but axially displaceably limited relative thereto. Axially between the pressure plate 3 and the housing 2 a pressure disc spring 4 is interlocked, which can be tilted about an annular pivot carried by the housing 2, serving as a support 5. Pressure plate 3 exerts pressure towards a counter-pressure plate fixedly connected with the housing 2, for example a flywheel, through which the friction linings of the clutch plate can be clamped between the friction linings of the pressure plate 3 and of the counter pressure plate.

The pressure plate 3 is non-rotatably connected with the housing 2 through leaf springs 9 aligned in the circumferential direction or, if applicable, in a tangential direction. The clutch plate interacting with the clutch 1 preferably has so-called cushion deflection segments that ensure a progressive torque build-up when engaging the friction clutch, in that they enable a progressive rise of the axial forces acting on the friction lining over a limited axial displacement of both friction linings of the clutch disc towards one another.

In the illustrated embodiment, the disc spring 4 has an annular base body 4a that applies the clamping force, and from which the radially inwardly extending activation fingers 4b originate. The disc spring 4 is installed in a manner so that it exerts pressure against the pressure plate 3 with the radially outer regions 6, and with the radially inner regions 7 it can be tilted about the support 5.

In addition to the leaf-spring-type spring means 9, further spring means 10 and 11 are effective between the housing 2 and the pressure plate 3. Further spring means 10 is formed here spider-like and is interlocked between the housing 2 and the disc spring 4 such that it exerts an axial force on the disc spring 4, thus pressing the disc spring 4 toward the housing 2 and hence also against the support 5. For that purpose, the additional spring means 10 is axially supported on the housing 2 and exerts pressure on the disc spring 4 with the finger-shaped regions 12.

Figure 3:
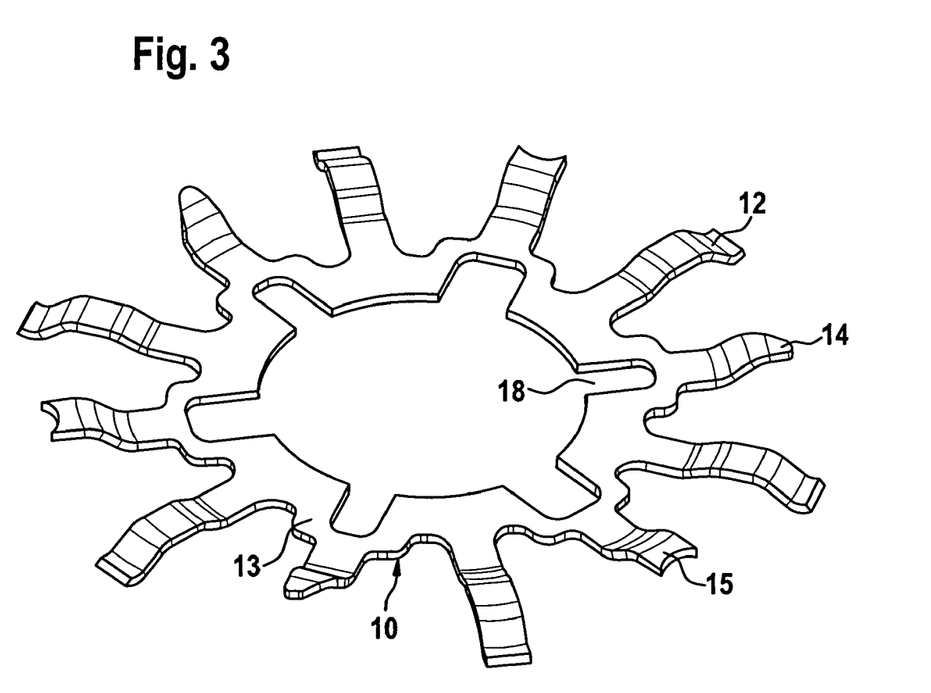
FIG. 3 shows an additional spring means for a friction clutch based on FIGS. 1 and 2, in a magnified scale.

As is visible in FIG. 3, further spider-like spring means 10 have for instance an annular region 13 closed in the circumferential direction, from which the finger-shaped regions 12 extend radially outward. When viewed in the circumferential direction, support arms 14, 15, are provided between the finger-shaped regions 12. In the mounted state of further spring means 10 in the friction clutch 1, the support arms 14, 15 are supported on the support regions carried by the housing, which are formed by spacer posts 16 in an embodiment of a friction clutch according to FIG. 2. The spacer posts 16 are riveted to the housing 2 and extend axially through the disc spring 4. For that purpose, the disc spring 4 has corresponding cutouts. The spacer posts 16 have a head-shaped formation or enlargement 17 on which the support arms 14, 15 are axially supported. In the assembly of further spring means 10, the latter is interlocked in a springy manner, in order to develop the supporting force required for supporting the disc spring 4. Advantageously, both the finger-shaped regions 12 as well as the support arms 14, 15 can have spring-elastic properties. In addition, the closed annular region 13 can be used to generate the desired spring characteristic. As is apparent from FIG. 3, in the illustrated embodiment of further spring means 10, radially within the support arms 14, 15 cutouts 18 oriented radially outward are provided, by which the inner portion of closed area 13 exhibits a meander-shaped curve in the circumferential direction.

For the assembly of further spring means 10, first, only three spacer posts 16 can be riveted to the housing 2. Thus, by axial insertion in the housing 2 and rotation of further axially preloaded spring means 10, first the support arms 14 come in contact on the enlargements 17 of the spacer posts 16. In that manner, practically, a bayonet-type connection occurs between the housing 2 and further spring means 10.

Subsequently, three additional spacer posts 16 can thereafter be riveted to the housing 2, on which the support arms 15 can be supported with a preload. The non-rotational connection between the housing 2 and further spring means 10 is simultaneously ensured via the arms 15. The outer end regions of the support arms 15 are curved to conform with the diameter of the spacer posts 16 for that purpose.

As is apparent from FIGS. 1 and 2, the friction clutch 1 includes an additional spring means 11, which is designated hereinafter as disc-spring-type sensor spring 11. The disc-spring-type sensor spring 11 has an annular base body 19, from which fingers 20 extend radially outward. The fingers 20 are supported with an axial preload on further outwardly lying regions 6 of the disc spring 4. That axial preload is ensured by the stressed mounting position of the disc-spring-type sensor spring 11. The stressed mounting position is achieved through the support of the disc-spring-type sensor spring 11 on the spacer posts 16. For that purpose, the disc-spring-type sensor spring 11 can have corresponding arms or radial arms extending radially inward, which, for instance, interact with the enlargements 17 of the spacer posts 16. The disc-spring-type sensor spring 11, in a similar manner as described above in connection with further spring means 10, can be assembled with the housing 2 by means of a bayonet-type assembly.

Prior to assembly or partial assembly of further spring means 10 and of the disc-spring-type sensor spring 11, the disc spring 4 must first be inserted in the housing 2—as is visible in FIGS. 1 and 2.

Figure 4:
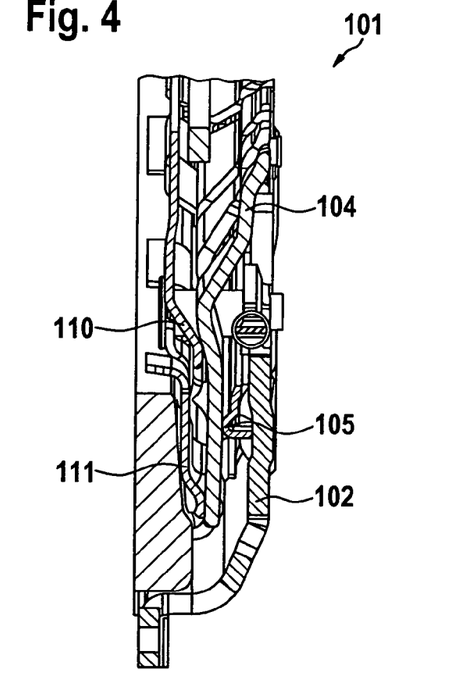
FIG. 4 shows a half-sectional view through a further embodiment of a friction clutch according to the present invention.
Figure 5:
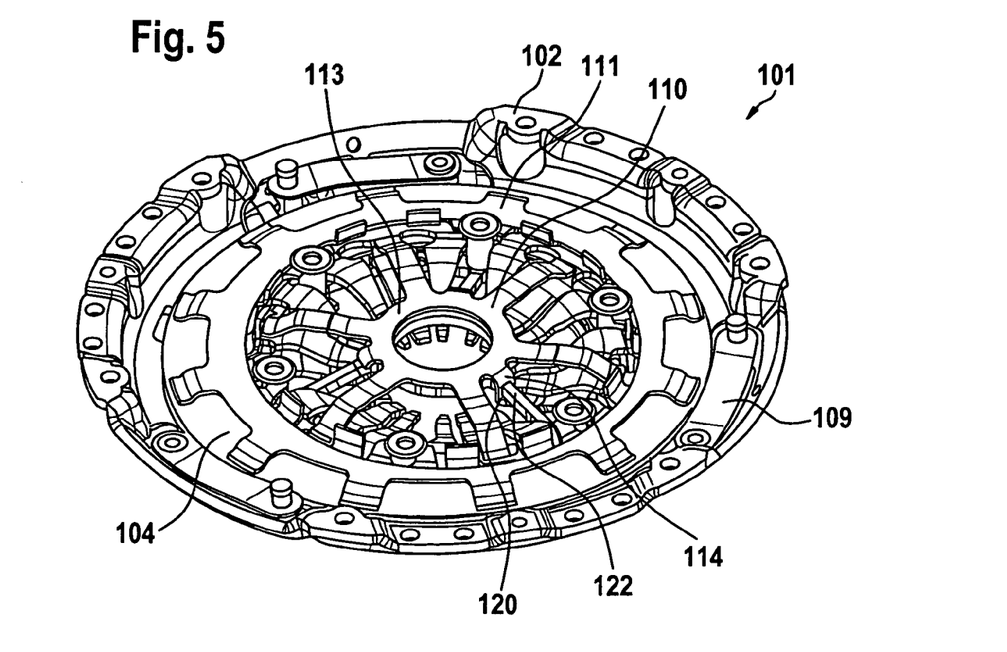
FIG. 5 shows a perspective interior view of the friction clutch according to FIG. 4 without the pressure plate.

The friction clutch 101 illustrated in FIGS. 4 and 5, has essentially the same design as the friction clutch 1 shown in FIGS. 1 and 2. The disc spring 104 is likewise rotatably mounted in the housing 102 opposite a support 105. The axial support of the disc spring 104 is again provided by means of leaf springs 109, a further spring means 110, and a disc-spring-type sensor spring 111. The significant difference between the clutch embodiment shown in FIGS. 4 and 5 with the embodiment shown in FIGS. 1 and 2 lies in the formation of further spring means 110 and its support on the housing 102.

Figure 6:
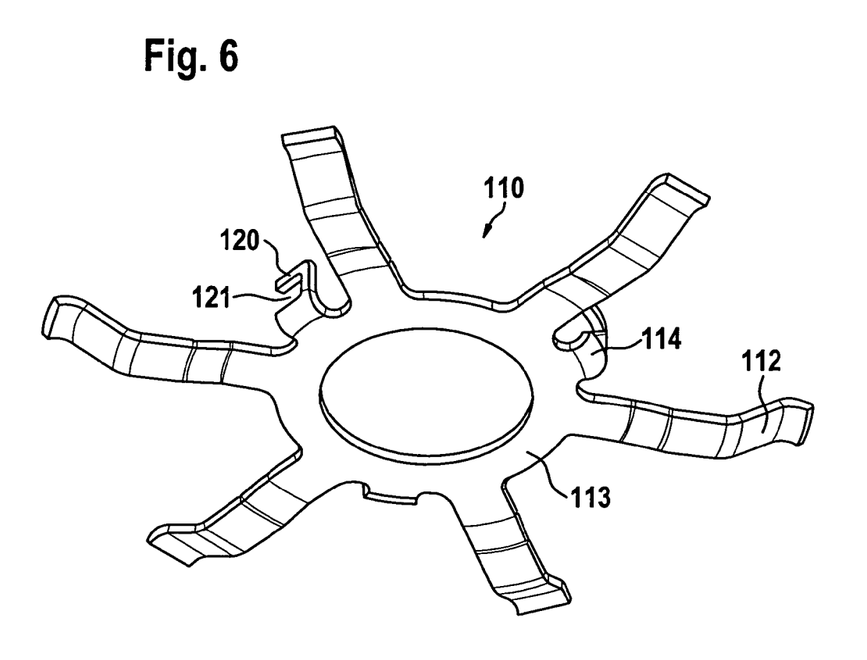
FIG. 6 shows an additional spring means for a friction clutch based on FIGS. 4 and 5 in a magnified scale.

From FIG. 6 it is apparent that further spring means 110 includes an annular base body 113, from which finger-shaped regions or arms 112 extend radially outwardly. The finger-shaped regions 112 support the disc spring 104 of the friction clutch 101 in a similar manner as the finger-shaped regions 12 shown in FIGS. 1-3.

From FIG. 6 it is further apparent that axially oriented fingers 114 are formed on the radial outer region of the annular base body 113. The fingers 114 are disposed between finger-shaped regions 112 in the circumferential direction. Three such fingers 114 are provided in the illustrated embodiment. The fingers 114 are used to support further spring means 110 on the housing 102.

The connection between further spring means 110 and the housing 102 is provided by means of a rotary plug-in connection, such as a bayonet-type connection.

To provide the rotary plug-in connection, the fingers 114 include suspension regions 120, which are formed by a circumferential cutout 121 in the fingers 114. The suspension regions 120 interact with support regions 122 of the housing 2, as is visible in FIG. 5. The support regions 122 are preferably integrally formed with the housing 102. The support regions 122, for instance, can be formed as a single piece with the support regions 122 in the form of bars carried by the housing 102. The individual support regions 122 can be connected with one another radially inwards via an annular closed area. The annular closed area can be disposed axially adjacent to the annular base body 113. The support regions 122 can be established and formed in a similar manner as described in connection with FIG. 12 of DE 43 45 215 B4.

Figure 7:
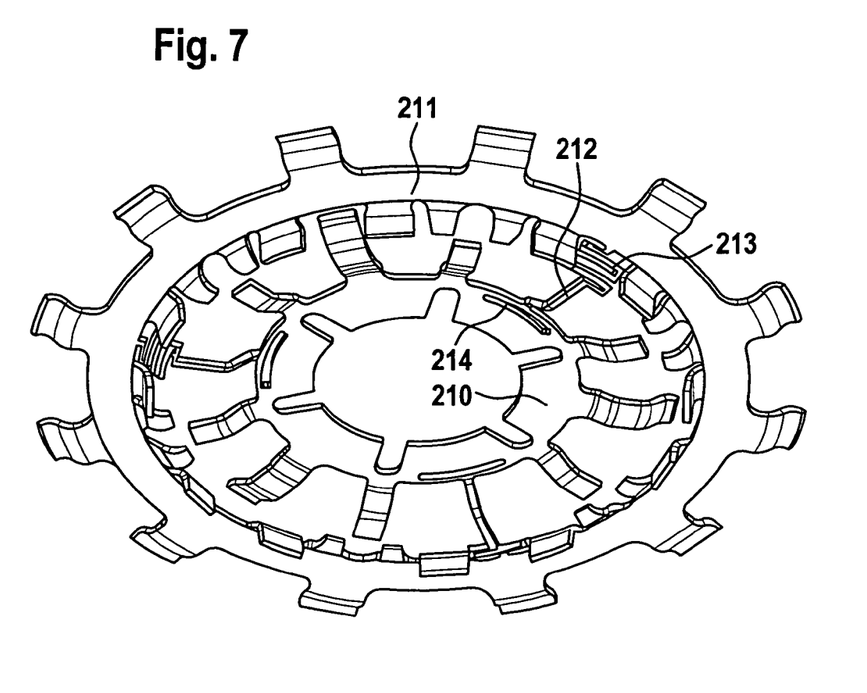
FIG. 7 shows a related embodiment of an additional spring means and a disc-spring-type sensor spring, for instance, which can be used for a friction clutch embodiment based on FIGS. 1 and 2.

In FIG. 7, a related embodiment of a disc-spring-type sensor spring 211 and of an additional spring means 210 is shown. Owing to such related structure of spring elements 210 and 211, the assembly of the corresponding friction clutch can be essentially simplified.

From FIG. 7, it is apparent that the disc-spring-type sensor spring 211 and a further spring means, or the additional spring means 210, are connected via connection sections 212 that are elastically flexible in the axial direction. To ensure the flexibility of the connection sections 212, the latter have meander-shaped regions 213 in the radial direction, as well as torsional regions 214, by which means they are connected with the corresponding spring element 210 and/or 211.

Figure 8:
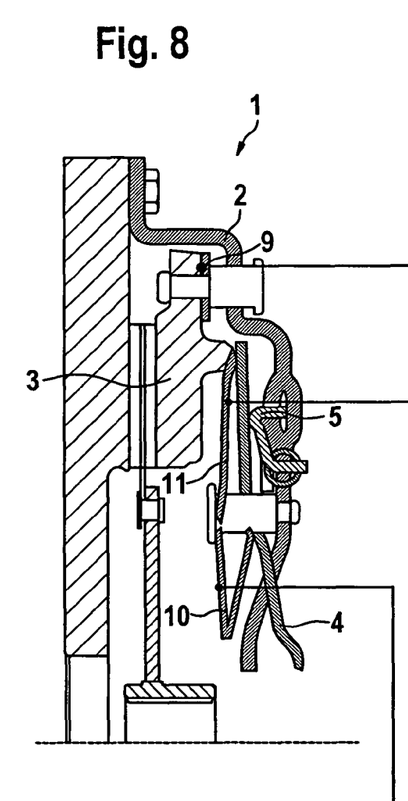
FIGS. 8 to 11 show a friction clutch in sections and graphs with functional characteristic curves of different spring means for such a friction clutch according to the present invention.
Figure 9:
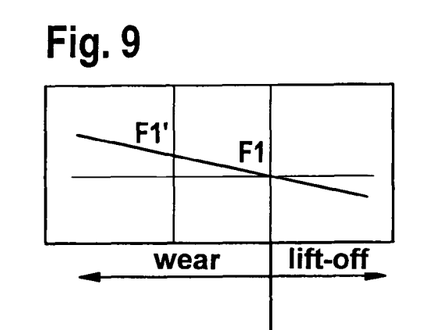
Figure 10:
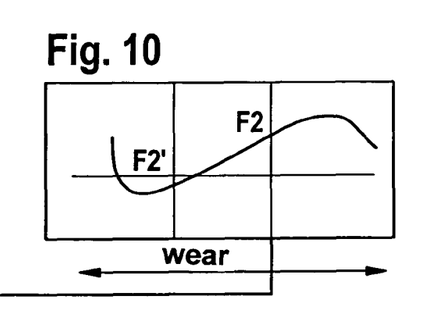
Figure 11:
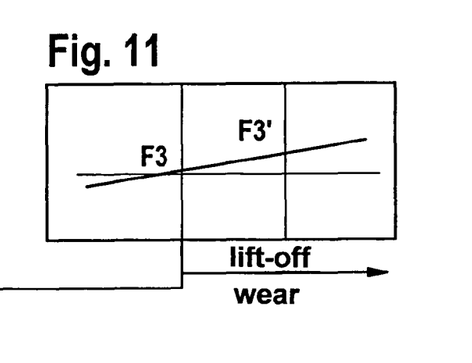

As is evident in connection with the friction clutch 1 schematically illustrated in FIG. 8, and as visible in the three graphs associated with FIG. 8 and shown in FIGS. 9, 10, and 11, further spring means 10 is shaped and is installed stressed in such a manner that it acts against both the disc spring 4 axially when disengaging the friction clutch 1 according to the release travel toward the housing 2, such that it at least also exhibits a progressive force characteristic over the lift-off travel of the pressure plate 3. That means that when considered over the lift-off travel of the pressure plate 3 or the pivot angle of the disc spring 4 about the support 5—the axial force exerted by further spring means 10 on the disc spring 4 at least over a partial area will be greater, preferably, over the total lift-off travel of the pressure plate 3 or pivot angle of the disc spring 4.

As is apparent from the graph shown in FIG. 9, the leaf springs 9 are likewise subjected to axial stress between the housing 2 and the pressure plate 3. The stress in the leaf springs 9 is applied such that—when considered over the lift-off travel of the pressure plate 3—the axial force exerted by leaf springs 9 on the pressure plate 3, and hence on the disc spring 4, in the lift-off direction of the pressure plate 3 becomes smaller. With the increase in friction-lining wear, the stress in the leaf springs 9, increases, however, in that also the axial force exerted by the latter increases. The axial force produced by further spring means 10 on the disc spring 4 likewise increases in proportion to the increase in friction-lining wear of the clutch plate, as is apparent in the graph shown in FIG. 11.

FIG. 10 shows a possible load-travel characteristic for a disc-spring-type sensor spring 11. In the graph shown in FIG. 10, it is apparent that with the increase in clutch plate friction-lining wear, the axial force exerted by the disc-spring-type sensor spring 11 on the disc spring 4 becomes smaller.

The load-travel characteristics of the spring elements 9, 10, and 11 are coordinated with one another in a manner that the decrease in the axial force exerted by the disc-spring-type sensor spring 11 occurring as a result of the clutch plate friction lining wear is compensated by the increasing axial forces that are exerted by the leaf springs 9 and by further spring means 10, which likewise acts on the disc spring 4.

The exemplary embodiments are not to be understood as a restriction of the invention. Rather, within the scope of the present disclosure, numerous changes and modifications are possible, particularly such that can be formed by combination or modification of individual features or elements or process steps in connection with those in the general description and in figure descriptions, as well as in the claims and drawings.

What is claimed is:

1. A friction clutch for use in a drive train, said clutch comprising: a pressure plate that is non-rotatable with respect to a clutch housing and is axially displaceable relative to the clutch housing, a disc spring provided between the housing and the pressure plate for exerting an axial force on the pressure plate, an adjusting device acting between the housing and the disc spring for compensation at least of friction lining wear of a clutch plate that interacts with the pressure plate of the friction clutch when it is mounted in the drive train, wherein the disc spring can be pivoted relative to an annular support carried by the housing to exert a force via a spring group axially toward the annular support, wherein the spring group causing the axial force on the disc spring includes at least the following spring elements,
    a plurality of circumferentially arranged leaf springs each having a pair of ends and connected on one end with the housing and on another end with the pressure plate, and wherein in the mounted state of the friction clutch the leaf springs provide a preload that urges the pressure plate axially toward the disc spring, wherein upon an increase in friction lining wear, axial force exerted by the leaf springs on the pressure plate increases,
    a sensor spring that is elastically operatively biased between the housing and the disc spring, wherein the sensor spring exerts an axial force toward the annular support,
    at least one additional spring elastically operatively biased between the housing and the disc spring, wherein the additional spring exerts on the disc spring an axial force toward the annular support, and wherein the additional spring has an increasing force characteristic when pivoting the disc spring to disengage the friction clutch and when there exists an increase in friction lining wear.

2. The friction clutch according to claim 1, wherein over the life span of the friction clutch at least the pressure plate and the disc spring experience an axial displacement relative to the housing at least owing to the friction lining wear, through which biasing forces of the leaf springs, of the sensor spring and of the additional spring change.

3. The friction clutch according to claim 1, wherein the annular support of the disc spring is axially displaced by the adjusting device in dependence upon incurred friction lining wear.

4. The friction clutch according to claim 1, wherein the introduction of the axial force exerted by the sensor spring on the disc spring occurs at least approximately at a radial height of the annular support between the disc spring and the pressure plate.

5. The friction clutch according to claim 1, wherein axial force of the additional spring on the disc spring is exerted radially inward of the annular support.

6. The friction clutch according to claim 1, wherein with reference to the support of the disc spring axial forces exerted by, the sensor spring and by the additional spring on the disc spring respectively occur on different radial sides of the annular support.

7. The friction clutch according to claim 6, wherein axial force is exerted on the disc spring radially outward of the annular support by the sensor spring acting on the disc spring, and an axial force is exerted on the disc spring radially inward of the support by the additional spring means.

8. The friction clutch according to claim 1, wherein the additional spring includes an annular area from which originate a plurality of flexible arms oriented radially outward, which flexible arms axially engage and press against the disc spring to urge the disc spring against the annular support, and the annular area of the additional spring is axially supported relative to the clutch housing.

9. The friction clutch according to claim 8, wherein radial support arms originate from the annular area of the additional spring to engage the housing and support the additional spring on the housing.

10. The friction clutch according to claim 9, wherein the radial support arms are connected with the housing by a bayonet connection.

11. The friction clutch according to claim 9, wherein the radial support arms contact and are supported axially by support regions provided on the housing.

12. The friction clutch according to claim 1, wherein the additional spring includes a radially inner annular region that is connected with the housing and further includes a plurality of radially outwardly extending fingers that engage and press against the disc spring on a side of the disc spring that faces the pressure plate.

* * * * *